United States Patent [19]

Latora

[11] 4,002,298
[45] Jan. 11, 1977

[54] CHEESE GRATING MACHINE

[76] Inventor: Salvatore C. Latora, 3159 Baker St., San Francisco, Calif. 94123

[22] Filed: Oct. 16, 1975

[21] Appl. No.: 622,860

[52] U.S. Cl. .................................. 241/36; 241/92; 241/278 R; 241/280

[51] Int. Cl.² .................. B02C 18/14; B02C 18/22

[58] Field of Search .......... 241/36, 37.5, 92, 273.2, 241/280, 278 R, 281, 282; 83/62, 69, DIG. 1

[56] References Cited

UNITED STATES PATENTS

| 224,405 | 2/1880 | Doane ............................... 241/282 |
| 233,611 | 10/1880 | Frambach .......................... 241/282 |
| 867,976 | 10/1907 | Irenius .............................. 241/282 |
| 2,515,923 | 7/1950 | Hansen .......................... 241/280 X |
| 2,714,490 | 8/1955 | Prechter .............................. 241/92 |
| 3,809,325 | 5/1974 | Marrie ......................... 241/278 R |
| 3,892,365 | 7/1975 | Veroun ............................... 241/92 |

*Primary Examiner*—Granville Y. Custer, Jr.
*Assistant Examiner*—Howard N. Goldberg
*Attorney, Agent, or Firm*—Julian Caplan

[57] ABSTRACT

For grating cheese for commercial purposes, a motor driven disk having grating surfaces is provided. A semi-cylindrical trough is aligned below the axis of rotation of the disk. A top is hinged to a housing for the motor and has a guard for the upper half of the disk and a cover for the trough. Within the trough is a pusher which pushes a block of cheese against the lower half of the disk. A motor advances the pusher through a rack-and-pinion drive. The top has a latch which engages the pinion to cause it to engage the rack when the top is down. Safety means are provided to stop the motors when the pusher is close to the disk. A further safety feature permits the motors to start only when the top is closed.

8 Claims, 7 Drawing Figures

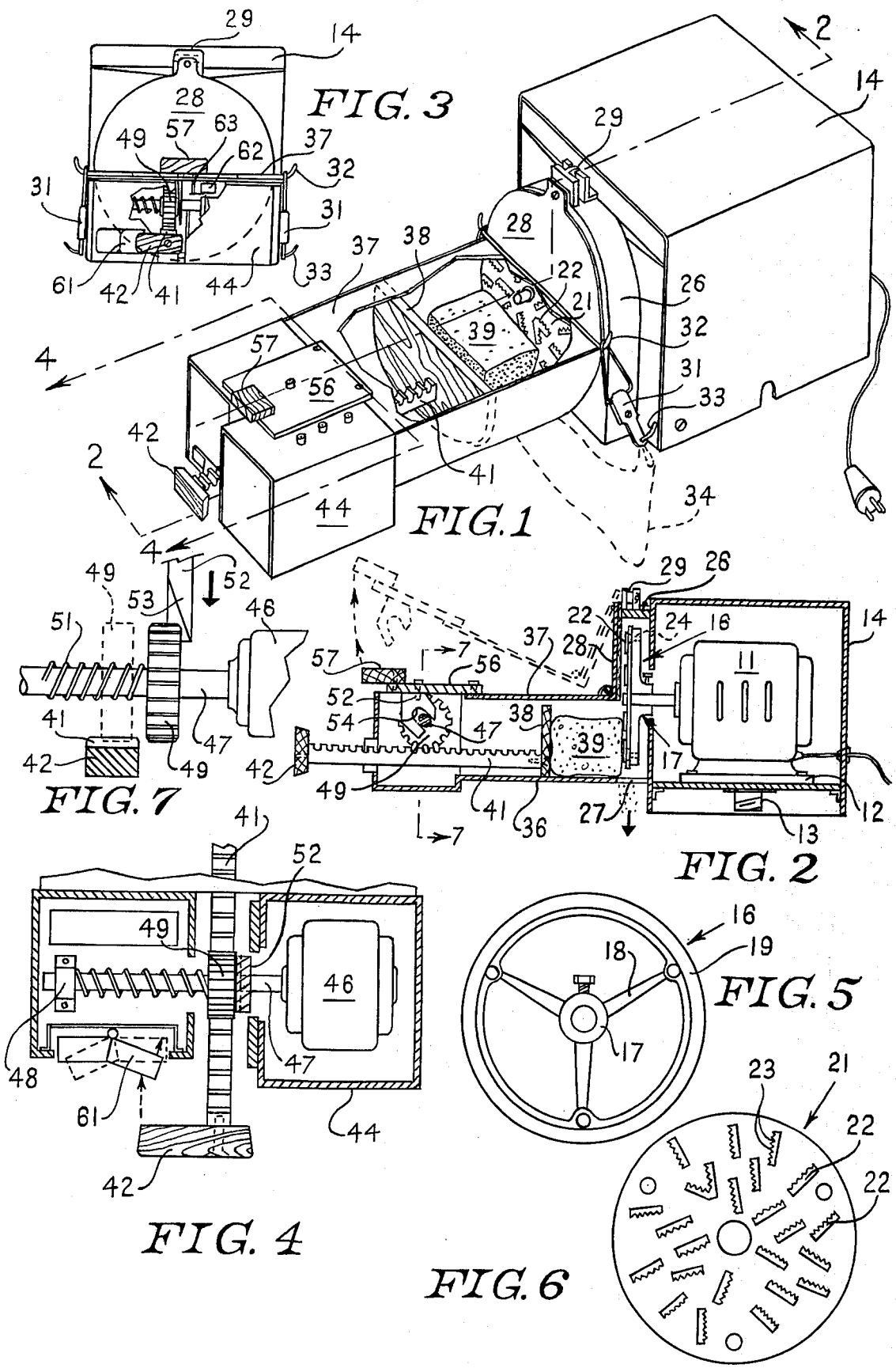

CHEESE GRATING MACHINE

This invention relates to a new and improved motor-driven cheese grating machine. The motor drives a rotating disk formed with teeth which grate the cheese and feeds the grated particles behind the disk. The particles drop into a bag below the housing for the disk. This machine is particularly suitable for use in delicatessens, restaurants and facilities for packing cheese where large quantities of a type of cheese which is hard or semi-hard is grated.

Initially a pusher which pushes the cheese into contact with the rotating disk is manually set for light pressure of the cheese against the disk. Thereupon, the pusher is automatically advanced so that the operator can devote his attention to other matters.

One of the advantages of the present invention is the provision of a number of safety features which prevent injury to personnel or damage to the apparatus. Thus a cam action is provided so that there is no mechanical advance of the pusher bar toward the rotating disk until a cover is in position. The motor driving the disk and the motor driving the pusher advance are not energized until the top is down. Another safety feature is the fact that the motors are stopped when the pusher comes close to the disk.

Accordingly, the present invention provides a motor-driven disk which grates the cheese rapidly and conveniently without danger to personnel.

Other objects of the present invention will become apparent upon reading the following specification and referring to the accompanying drawings in which similar characters of reference represent corresponding parts in each of the several views.

In the drawings:

FIG. 1 is a perspective view of the apparatus partly broken away to reveal internal construction.

FIG. 2 is a longitudinal sectional view taken substantially along the line 2—2 of FIG. 1.

FIG. 3 is an end elevational view from the left of FIG. 1.

FIG. 4 is an enlarged sectional view taken substantially along the line 4—4 of FIG. 1.

FIG. 5 is an elevational view of the spider on which the disk is mounted.

FIG. 6 is an elevational view of the disk.

FIG. 7 is a sectional view taken substantially along the line 7—7 of FIG. 2.

A high speed electric motor 11 is mounted on a base 12 which is provided with a rotary nipple-type mounting 13 which may receive an upstanding pivot fixed to a counter, table or other surface so that the device may be swung between a storage and an operative position. Surrounding the motor 11 is a housing 14. Directly connected to the shaft of motor 11 is a spider 16, as best shown in FIG. 5, having a hub 17 which receives the motor shaft, radial arms 18 and a surrounding rim 19. Disk 21 is mounted on and supported by spider 16. A pattern of outwardly upstruck rectangular members 22 which are die cut into the disk 21 are provided with teeth 23 on their leading edges. As is shown in FIG. 6, the pattern of upstruck members 22 entirely covers the area of disk 21. Since the arms 18 occupy only a portion of the area behind the disk, as cheese is cut by the teeth 23 it is deflected by the upstruck portions 22 to the right as viewed in FIG. 2. Bolts 24 hold the disk 21 on the spider 16.

Surrounding the disk 21 is a disk housing 26 which is fixed to the front of housing 14. Housing 26 is formed with an opening 27 on the bottom for discharge of cheese grated by the disk 21. A semi-circular top guard 28 covers the top half of the disk 21 and is attached to housing 26 by hinge 29 so that the guard 28 may be swung about a horizontal pivot transverse to the axis of motor 11. Latch 31 on the lower edges of housing 26 engage hooks 32 on the lower edge of cover 28 and holds the cover in operative position as shown in solid lines in FIG. 2. When the latch 31 is opened, the cover 28 may be swung in a clockwise direction as shown in FIG. 2. Attached to latch 31 are bag hooks 33 which are used to engage the upper edges of a bag 34 positioned below the opening 27 to catch the grated cheese as it is produced.

Extending below the lower edge of guard 28 is a semicylindrical trough 36 which extends out to the left of the disk 21 as viewed in FIG. 2. Cover 37 which fits over the trough 36 in an air-tight manner is fixed to the lower edge of guard 28. Reciprocating within trough 36 is a pusher 38 which is made of a plastic or wood material so that it is not damaged by contact with the disk 21. A piece of cheese 39 is inserted behind the pusher 38 and the function of the machine is to push the cheese 39 against the disk 21 as it revolves, thereby grating the cheese. To advance the pusher 38 there is a rack 41 fixed thereto and extending to the left as viewed in FIG. 1 just above the bottom of trough 36. A handle 42 is fixed to the outer end of rack 41. Initially, the operator pulls the handle to the left, inserts the cheese 39 behind the pusher 38 and then manually pushes the handle 42 so that the surface of the cheese 39 lightly touches the disk 21.

On the outer end of trough 36 is a housing 44 which contains a second motor 46 having a transverse horizontal shaft 47 which is supported at its outer end by a bearing 48. Movable along the shaft 47 is a pinion 49 which is biased to the right as viewed in FIG. 4 by a helical spring 51 around the shaft 47. The function of spring 51 is to move pinion 49 to the right so that it is out of engagement with rack 41 when the cover 37 is up (dot-dash position of FIG. 2). A plate 56 extends out to the left of cover 37. On the underside of plate 56 is a cam member 52 formed with a bevel 53 and a slot 54. When the cover 37 is lowered to the solid line position of FIG. 2, the bevel 53 comes in contact with the side of pinion 49 and forces it to the left as viewed in FIG. 4 causing the pinion 49 to engage the rack 41. For this purpose shaft 47 and the bore in pinion 49 are noncircular so that no key is required and the pinion shifts easily. When the cover is lifted, the spring 51 moves the pinion 49 to one side so that it does not mesh with the rack 41 and the rack may be moved freely to right or left as viewed in FIG. 2 to bring a cheese 39 of any size which is accommodated by the trough 36 into contact with disk 21. Finger lift 57 which projects from the edge of plate 56 is a convenient means for lifting cover 37.

Main switch 61 mounted on the front of housing 44 controls energization of motor 11 and motor 46. A safety switch 62 is located inside housing 44 and the plate 56 is provided with a pin 63 which contacts the switch 62 only when the cover 37 is closed. Thus switches 61 and 62 are in series with the winding of both motor 11 and 46.

Assuming that the cover 37 is closed and that switch 62 is closed, the operator, after installing the cheese 39 in position, moving the handle 42 so that the pusher 38 moves the cheese 39 into light engagement with disk 21 and then closes cover 37 and closes switch 61 so that it is in the solid line position of FIG. 4. This causes the motor 11 to turn disk 21 at a high rate of speed and also causes motor 46 (which has a gear reduction function built into it or uses a separate reduction gearage) to turn pinion 49 (which is now in mesh with rack 41 so as to push the rack 41 to the right), as viewed in FIG. 2, and thereby through the instrumentality of pusher 38 to push the cheese 39 against the disk 21. The particles of cheese are grated by the teeth 23 and are fed through the spider 16 and down through the opening 27 into bag 34 or other receptacle. When the handle 42 approaches the end of its travel, it contacts switch 61 and turns off the motors 11 and 46.

What is claimed is:

1. A cheese grating machine comprising a disk formed with grating teeth on its surface, means for rotating said disk, an enclosure around the periphery of said disk having a grated cheese dispensing aperture, a trough parallel to the axis of rotation of said disk, a pusher reciprocable in said trough to push a block of cheese in said trough into contact with said disk, pusher advancing means to push said pusher toward said disk, a cover for said trough, hinge means for said cover and means for securing said cover in closed position and safety means to interrupt operation of said means for rotating said disk and said pusher advancing means, said safety means being responsive to said cover being open or to said pusher being in close proximity to said disk.

2. A machine according to claim 1 in which said pusher advancing means comprises a rack fixed to said pusher, a pinion meshing with said rack, and means for rotating said pinion.

3. A cheese grating machine comprising a disk formed with grating teeth on its surface, means for rotating said disk, an enclosure around the periphery of said disk having a grated cheese dispensing aperture, a trough parallel to the axis of rotation of said disk, a pusher reciprocable in said trough to push a block of cheese in said trough into contact with said disk, a rack fixed to said pusher, a pinion meshing with said rack, means for rotating said pinion, said pinion being movable between operative position meshing with said rack and inoperative position, a cover for said trough, hinge means for said cover and means for securing said cover in closed position and means on said cover to move said pinion to operative position only when said cover is closed.

4. A machine according to claim 3 which further comprises a shaft, said pinion being slideable longitudinally on said shaft, a spring biasing said pinion toward the inoperative position, said means on said cover comprising a cam engageable with said pinion to slide said pinion on said shaft against the force of said spring.

5. A machine according to claim 1 in which said pusher advancing means comprises a motor and said safety means comprises a switch controlling said motor and in which said cover has switch engaging means to close said switch only when said cover is closed.

6. A machine according to claim 2 in which said means for rotating said disk comprises a motor and a switch and in which said safety means comprises means movable with said rack to open said switch when said pusher is in close proximity to said disk.

7. A machine according to claim 1 in which said means for rotating said disk comprises a motor having a shaft and a spider on said shaft, said disk being detachably fixed to said spider.

8. A machine according to claim 7 in which said disk has approximate rectangular upstruck portions at an angle to the plane of said disk and formed with said teeth on their leading edges, said teeth being disposed in a pattern whereby the entire surface of said block of cheese facing said disk is engaged by a plurality of teeth.

* * * * *